Nov. 27, 1951

H. N. BOWES 2,576,499

FREQUENCY STABILIZED PHASE SHIFTING NETWORK

Filed Oct. 19, 1949

INVENTOR.

Henry N. Bowes

BY T. L. Bowes

Atty.

Patented Nov. 27, 1951

2,576,499

UNITED STATES PATENT OFFICE 2,576,499

FREQUENCY STABILIZED PHASE SHIFTING NETWORK

Henry N. Bowes, Rochester, N. Y., assignor to Stromberg-Carlson Company, a corporation of New York Application October 19, 1949, Serial No. 122,220

5 Claims. (Cl. 323—106)

This invention relates to phase shifting networks and methods of operating the same, more particularly to frequency stabilized phase shifting networks and methods which may be employed to effect a shift in the phase of an applied voltage without substantial variation in the phase shift in response to changes in the frequency of the input voltage, and the invention has for an object the provision of improved and reliable frequency stabilized phase shifting networks and methods of this character.

Phase shifting networks for effecting a constant phase shift in an applied voltage, in order to supply multi-phase voltages from a single phase source, find many applications in the art, one important application, for example, being in connection with the circular sweep or deflection circuits for cathode ray oscilloscopes and the like, and the invention is herein shown, for purposes of illustration, as applied to a circuit of this character for effecting proper focusing of the cathode ray beam from a source of doubtful frequency stability.

It is a further object of the invention to provide a reactive-resistive phase shifting network in which the resistance of the resistive branch of the network is caused to vary in accordance with changes in the frequency of the applied signal.

It is another object of the invention to provide a capacitative resistive phase shifting network in which the resistance of the resistive branch has a frequency-resistance characteristic equal to the frequency-reactance characteristic of the capacitative branch.

Still another object of the invention is to provide methods and means for frequency stabilizing a phase shifting network of the reactive-resistive type in which a control voltage derived from the applied signal voltage and having a magnitude related to the frequency thereof is employed to vary the resistance in the resistive branch of the network.

In carrying out the invention in one form, a phase shifting network is provided having a reactive branch and a resistive branch connected between input and output terminals, the reactive branch including reactive impedance means having an impedance which varies in response to the frequency of the applied signal, and the resistive branch including a voltage responsive nonlinear resistance element, together with frequency responsive means energized by the applied signal for developing a bias voltage having a magnitude related to the frequency of the signal for controlling the resistance element to provide a frequency-resistance characteristic in the resistive branch equivalent to the frequency-reactance characteristic of the reactive impedance means.

More particularly, the frequency responsive means comprises differentiator means energized by the applied signal for developing an alternating current voltage related in magnitude to variations in the frequency, together with peak detector means energized from the differentiator for developing a direct current potential of corresponding magnitude, and the voltage responsive nonlinear resistance comprises an electron discharge device having anode and cathode electrodes connected in the resistive branch of the network and having a grid electrode to which the direct current control potential is applied to vary the conductivity of the discharge device in accordance with variations in the frequency of the input signal.

For a more complete understanding of the invention reference should now be had to the drawing, in which:

Fig. 4 is a circuit diagram illustrating the manner in which a plurality of phase shifting networks of the types shown in Figs. 2 and 3 may be employed to supply the sweep circuit of an oscilloscope or the like.

Figure 1:
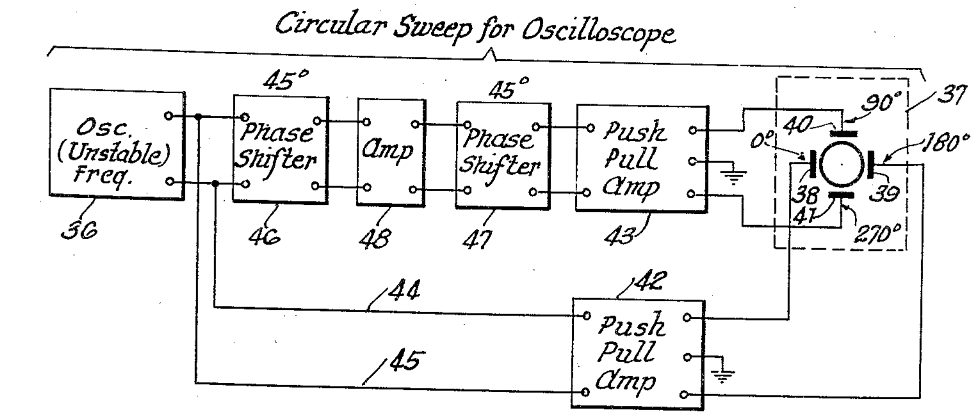
Fig. 1 is a circuit diagram of one fundamental type of phase shifting network in which the invention may be embodied.

Referring now to the drawing, the phase shifting network shown diagrammatically in Fig. 1 comprises input terminals 10, to which a suitable source of alternating current of doubtful frequency may be connected and to which is connected a frequency shifting network comprising a capacitative reactance branch including a capacitor 11 and a resistive branch including a resistor 12, the output terminals 13 being connected across the resistor 12 as shown. In the absence of special provisions, the reactance of the capacitor 11 will vary with frequency but the resistance of the resistor 12 will remain constant so that the phase shift obtained is a function of frequency. In Fig. 1 the resistor 12 is shown diagrammatically as constituting a variable resistor, and in accordance with the present invention constitutes a voltage responsive nonlinear resistance, as will be more fully described hereinafter.

Figure 2:
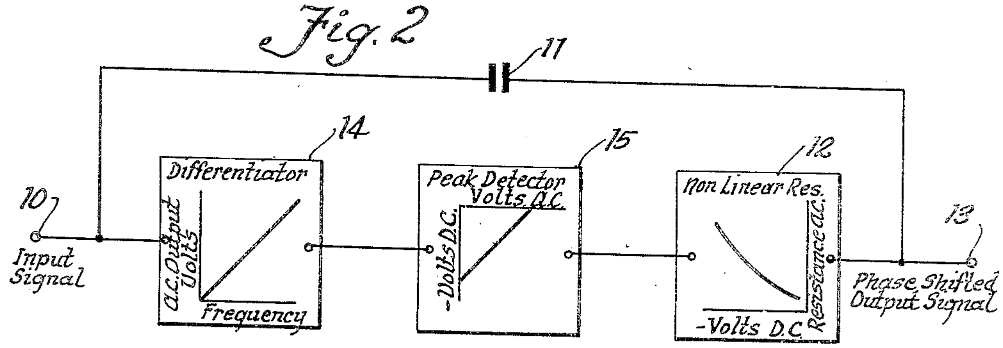
Fig. 2 is a block diagram representing a frequency stabilized network of the type shown in Fig. 1 embodying the present invention.

In the block diagram of Fig. 2 the resistive branch of the phase shifting network is shown as including a differentiator 14, a peak detector 15 and the nonlinear resistance 12, the various units having the respective characteristics illustrated thereon. Thus the differentiator 14 is indicated as being capable of providing an alternating output voltage, the magnitude of which is proportional to the frequency of the input signal applied to the differentiator 14 from the input terminals 10. Similarly, the peak detector unit 15 is indicated as providing a negative output direct current voltage which is inversely proportional to the A. C. voltage supplied to the peak detector from the differentiator unit 14. This output voltage is applied to the nonlinear resistance 12, which, as indicated, has an alternating current resistance characteristic directly proportional to the negative direct current voltage supplied thereto from the output of the peak detector unit 15. By properly adjusting the constants of the various units 14, 15 and 12, a resistance-frequency characteristic can be obtained which will exactly equal the reactance-frequency characteristic of the capacitor 11, and consequently an output voltage having a constant phase shift regardless of the frequency of the applied signal will be obtained on the output terminals 13.

The differentiator and peak detector units 14 and 15 may be of any suitable type well known in the art, and the voltage responsive nonlinear resistance 12 may be any suitable device having a resistance characteristic which is a function of voltage, such, for example, as silicon or germanium crystals or an electron discharge device such, for example, as a conventional triode.

Figure 3:
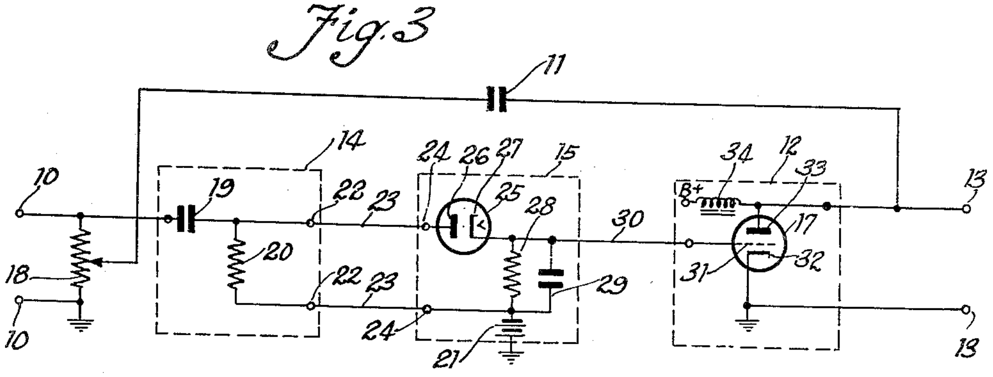
Fig. 3 is a circuit diagram showing details of the units and circuits illustrated in Fig. 2.

Referring now to the details of the circuit as shown in Fig. 3, wherein an electron discharge device 17 is employed as the nonlinear resistance, it will be observed that the input voltage applied to the input terminals 10 is applied through a suitable potentiometer 18 to the capacitative branch of the network including the capacitor 11 and to the input of the differentiator unit 14, which differentiator unit comprises a series connected capacitor 19 and a resistor 20, a suitable negative bias being applied to one terminal of the resistor 20 from a battery 21. The resistance of the potentiometer 18 is low in comparison to the reactance of the capacitor 11 and the resistance of the resistor 20 in the differentiator unit 14 and consequently the potentiometer 18 is effective only to adjust the level of the signal to prevent overloading the electron discharge device or triode 17.

As will be well understood by those skilled in the art, the voltage drop appearing across the resistor 20 will vary directly in proportion to the frequency of the voltage applied to the input terminals 10 due to the decrease in the reactance of the capacitor 19 upon an increase in frequency. Accordingly, an alternating current voltage will be developed at the output terminals 22 of the differentiator unit 14 which will be a direct function of the frequency as indicated in the block diagram of Fig. 2. This alternating current output voltage from the differentiator 14 is applied through conductors 23, for example, to the input terminals 24 of the peak detector unit 15, which peak detector unit comprises a diode 25 having anode and cathode electrodes 26 and 27, respectively, the diode 25 being connected as shown in circuit with a suitable diode load resistor 28 and the usual smoothing condenser 29.

The peak detector unit 15 is effective to develop across the diode load resistor 28 a direct current voltage which is directly proportional to the alternating current voltage supplied to the peak detector unit from the differentiating unit 14, and this direct current voltage is applied as indicated by the conductor 30 to the grid or control electrode 31 of the triode 17. At the same time, however, a fixed negative bias is applied from the battery 21 through the load resistor 28, and the conductor 30, to the control electrode 31, and accordingly the resultant output voltage from the detector unit, which output voltage is applied between the grid electrode 31 and the cathode electrode 32 of the triode 17, is inversely proportional to the A. C. input to the peak detector unit as indicated in the block diagram of Fig. 2.

In addition to the grid or control electrode 31 and the cathode electrode 32, the triode 17 includes an anode electrode 33 which is connected as shown to one of the output terminals 13, the other of which is connected to the grounded cathode 32, whereby the anode and cathode electrodes are connected in the network so that the triode 17 constitutes the nonlinear resistance represented by the element 12 in Fig. 1. A suitable source of plate current voltage for supplying space current to the triode 17 is indicated in Fig. 3 by the legend B+, which is connected to the plate electrode 33 of the electron discharge device 17 through an inductance 34 which has a large reactance compared to the A. C. plate resistance of the electron discharge device 17 and to the reactance of the capacitor 11 at the lowest operating frequency of the network.

The negative bias applied to the control electrode 31 from the biasing battery 21 is predetermined to adjust the operating range of the triode 17 so that at a predetermined frequency of the input voltage space current flowing through the triode 17 will provide an A. C. plate resistance proportioned to the capacitative reactance of the capacitor 11 so as to provide the desired phase shift at the output terminals 13. Upon a change in the frequency of the signal applied to the terminals 10, the value of the D. C. control voltage developed by the detector unit 15 will change so as to vary the conductivity, and consequently the dynamic resistance, of the triode. By properly proportioning the constants of the circuit, the dynamic plate resistance of the triode 17 may be caused to vary inversely proportional to the frequency, which is equivalent to the frequency characteristic of the capacitor 11 and which therefore produces a constant phase shift over a frequency range determined by the characteristic of the triode 17.

As will be readily apparent to those skilled in the art, the degree of phase shift obtained at the output terminals 13 is determined by the ratio between the reactive and resistive impedances in the two branches of the phase shifting network. A 45° phase shift is obtained when these impedances are equal in magnitude, and satisfactory operation may be obtained over a substantial range, at least 15° on either side of 45°. Moreover, it has been found that satisfactory control of the phase shift is obtained over a wide range of frequencies, so long as a constant amplitude of the input voltage is maintained.

In an illustrative example, a constant phase shift of 45° was obtained over a frequency range from 500 to 2000 cycles per second, utilizing an input signal having a constant amplitude of 80 volts. In this exemplary arrangement the following circuit constants were found to be satisfactory: capacitor 11 (.02 mf.), capacitor 19 (.001 mf.), potentiometer 16 (1000 ohms), resistor 20 (10,000 ohms), diode load resistor 28 (100,000 ohms), by-pass capacitor 29 (.1 mf.), bias battery 21 (10 volts), B+ (150 volts) and inductance 34 (1000 henries).

If it is desired to obtain a greater shift in phase than is conveniently obtainable by varying the ratio between the reactive and resistive impedances in the network, or to obtain a wider range of control, two or more phase shifting networks of the type shown in Fig. 3 may be cascaded, suitable amplifying means being employed to compensate for the attenuation introduced by the phase shifters.

Figure 4:
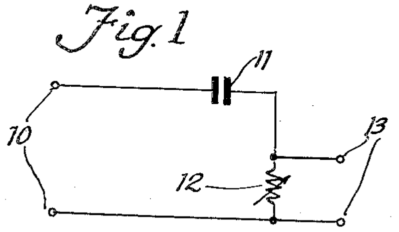

In Fig. 4, for example, an oscillator 36, designated as a source of unstable frequency, is employed to supply the necessary quadrature voltages to the deflector plates of an oscilloscope 37 to effect circular sweep of the cathode ray beam. As shown, opposed pairs of deflector plates 38—39 and 40—41 are respectively supplied from a pair of push-pull amplifiers 42 and 43, the input to the amplifier 42 being supplied directly from the oscillator 36 through the conductors 44 and 45, and the input to the oscillator 43 being supplied with a 90° phase-shifted signal through a pair of phase shifting networks 46 and 47 of the type shown in Fig. 3 which are adjusted each to provide a 45° phase shift and which are cascaded through a suitable amplifier 48. The indicated phase relationship of the voltages applied to the deflector plates of the oscilloscope 37 will remain constant regardless of variations in the frequency of the signal supplied by the oscillator 36, since each of the phase shifters 46 and 47 is frequently stabilized as hereinbefore explained.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A frequency stabilized phase shifting network comprising a reactive branch and a resistive branch connected between input and output terminals, reactive impedance means in said reactive branch having an impedance related to the frequency of the signal applied to said input terminals, resistive impedance means in said resistive branch including a voltage responsive nonlinear resistance element, and frequency responsive means energized by said signal for developing a direct current bias voltage having a magnitude related to the frequency of said signal for controlling said resistance element to provide a frequency-resistance characteristic in said resistive branch equivalent to the frequency-reactance characteristic of said reactive impedance means.

2. A frequency stabilized phase shifting network comprising a reactive branch and a resistive branch connected between input and output terminals, capacitor means in said reactive branch, a voltage responsive resistance element in said resistive branch, and frequency responsive means energizable from said input terminals for developing a direct current bias voltage having a magnitude related to the frequency of the signal applied to said input terminals for controlling said resistance element to provide a constant phase-shift at said output terminals regardless of variations in the frequency of the input signal.

3. A frequency stabilized phase shifting network comprising a reactive branch and a resistive branch connected between input and output terminals, reactive impedance means in said reactive branch having an impedance related to the frequency of the signal applied to said input terminals, resistive impedance means in said resistive branch including a voltage responsive nonlinear resistance element, differentiator means energized by said signal for developing an alternating current voltage related in magnitude to variations in the frequency of said signal, means including a peak detector energized by said alternating current voltage for developing a direct current potential of corresponding magnitude, and means for applying said direct current potential to said voltage responsive resistance element to provide a frequency-resistance characteristic in said resistive branch equivalent to the frequency-reactive characteristic of said reactance impedance means.

4. A frequency stabilized phase shifting network comprising a reactive branch and a resistive branch connected between input and output terminals, capacitor means in said reactive branch, an electron discharge device having anode and cathode electrodes connected in said resistive branch and having a grid electrode, means including frequency responsive detector means energizable from said input terminals for developing a direct current control potential having a magnitude related to the frequency of the signal applied to said input terminals, and means for applying said direct current control potential between said grid and cathode electrodes to vary the conductivity of said discharge device in accordance with variations in the frequency of the input signal.

5. A frequency stabilized phase shifting network comprising a reactive branch and a resistive branch connected between input and output terminals, capacitor means in said reactive branch, an electron discharge device having anode and cathode electrodes connected in said resistive branch and having a grid electrode, frequency responsive detector means energizable by the input signal applied to said input terminals for deriving therefrom a direct current control potential having a magnitude proportional to variations in the frequency of said input signal, a source of constant biasing potential applied to said grid electrode, and means for applying said direct current control potential between said grid and cathode electrodes for varying the conductivity of said discharge device in accordance with said variations in frequency.

HENRY N. BOWES.

REFERENCES CITED

The following references are of record in the file of this patent:

UNITED STATES PATENTS

| Number | Name | Date |
|---|---|---|
| 2,174,166 | Plebanski | Sept. 26, 1939 |
| 2,341,232 | Norton | Feb. 8, 1944 |